R. RUEDENBERG.
REGULATING COMMUTATOR MACHINES.
APPLICATION FILED JAN. 28, 1914. RENEWED OCT. 22, 1918.

1,305,011.

Patented May 27, 1919.
2 SHEETS—SHEET 1.

Witnesses:
Elsie Swenson
Ray J. Ernst

Inventor:
Reinhold Ruedenberg
by
Attorneys.

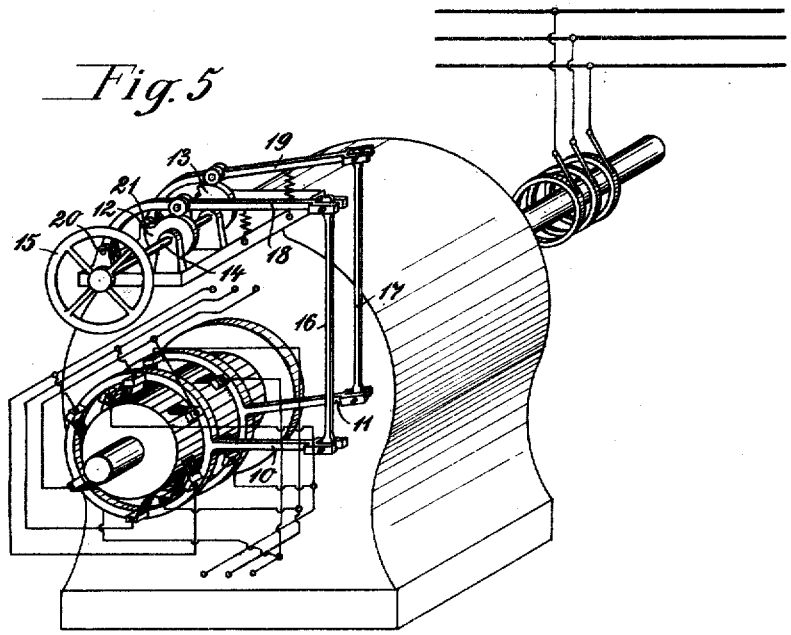
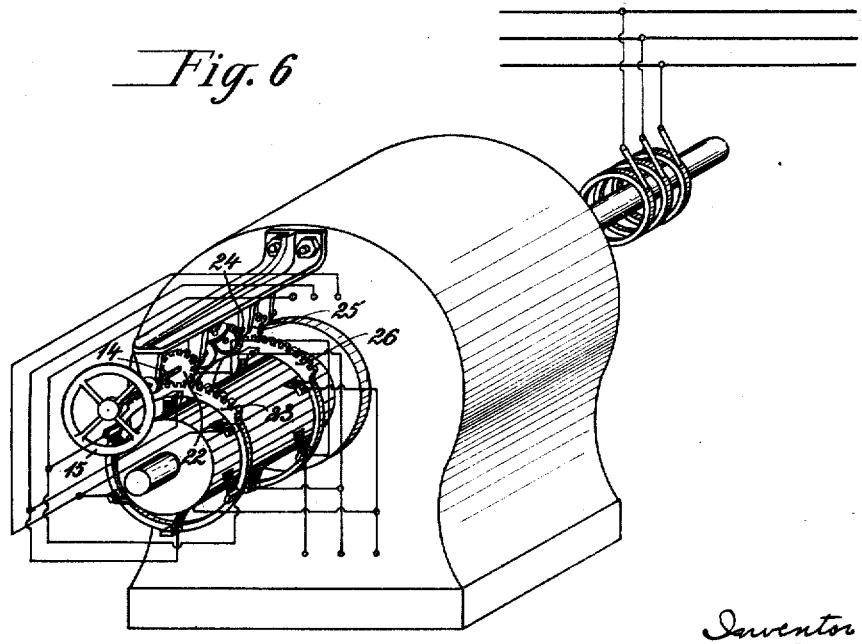

UNITED STATES PATENT OFFICE.

REINHOLD RUEDENBERG, OF BERLIN-CHARLOTTENBURG, GERMANY, ASSIGNOR TO SIEMENS-SCHUCKERTWERKE, G. M. B. H., OF BERLIN, GERMANY, A CORPORATION OF GERMANY.

REGULATING COMMUTATOR-MACHINES.

1,305,011. Specification of Letters Patent. Patented May 27, 1919.

Application filed January 28, 1914, Serial No. 814,973. Renewed October 22, 1918. Serial No. 259,301.

*To all whom it may concern:*

Be it known that I, REINHOLD RUEDENBERG, a German citizen, and resident of Berlin-Charlottenburg, Germany, have invented certain new and useful Improvements in Regulating Commutator-Machines, of which the following is a specification.

My invention relates to a single-phase or polyphase commutator motor which is fed from the mains over its rotor by means of slip rings and whose stator is supplied from brushes bearing upon the commutator.

The object of my present invention is to devise a construction permitting speed regulation and at the same time a phase compensation of a motor of this kind.

In general, there are two modes of construction for polyphase shunt motors with commutators which are different in mechanical and electrical respects. In one of these constructions the stator winding is fed by the line voltage of fixed value while the commutator brushes are supplied by a variable voltage obtained by means of taps from a transformer, whereby the speed of the motor will correspond to the amount of voltage impressed upon the commutator brushes. The phase compensation may easily be accomplished by introducing into the commutator brush-circuit a small and more or less constant additional voltage which is phase-displaced by approximately 90° and may be taken from a special transformer winding.

Figure 1:
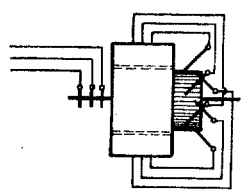
Figure 2:
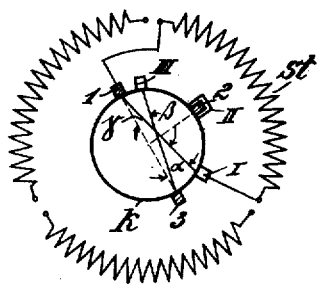
Figure 3:
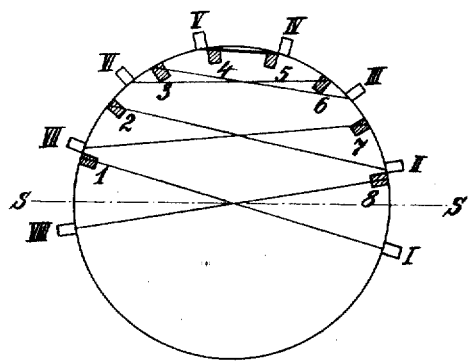
Figure 4:
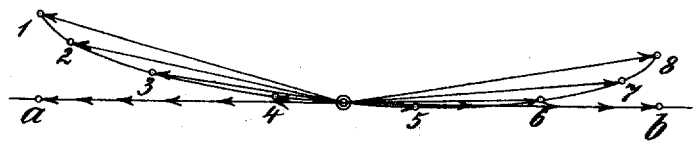

My invention will be more fully understood by reference to the accompanying drawings, of which Figure 1 is a diagrammatic view of the general arrangement of my present motor, Fig. 2 a wiring diagram indicating the connections between commutator brushes and stator-circuits, Fig. 3 a diagram indicating the manner of shifting the brushes for a speed and phase regulation, Fig. 4 a diagram for explaining certain characteristics of the motor, Figs. 5 and 6 perspective views, partly diagrammatic, showing two forms of regulating mechanism of the motor according to my present invention.

According to the general construction indicated in Fig. 1 the rotor winding of my motor is fed from the mains over the slip rings as shown, so that a constant voltage and frequency will be impressed upon the rotor, while the stator will obtain from the commutator a voltage which is of transformed frequency. If each phase winding of the stator is connected to each pair of brushes which are made movable with regard to each other, then any desired voltage may be taken off from the commutator and impressed upon the stator by changing this distance of the brushes. If the pair of brushes belonging to one phase is in a position to coincide, so that they will bear upon the same commutator segment, the stator voltage will become zero and the motor consequently run at a speed near synchronism. If, however, the brushes of one of such pairs are moved away from each other, the speed of the motor will decrease or increase to such an extent that the no-load slip will correspond to the voltage taken off from the commutator brushes, the magnitude of said voltages, in case of a sine-shaped field being given by the length of the geometrical chord between every pair of brushes, and according as to whether this connecting chord between the brushes of one pair possesses a positive or negative direction, the motor will assume a speed which is above or below synchronism respectively.

If a compensation of the phase displacement in motors of this kind is to be attained for speeds above as well as below synchronism, a phase-displaced voltage must be introduced in some manner into the stator circuit. This can be accomplished by slightly displacing the two brush systems on the commutator as a whole, so that the phase of the voltage impressed upon the stator will slightly differ from that which would be requisite for a pure speed regulation. If thus, for instance, a good power factor is obtained at speeds below synchronism, and if now a regulation of speed is accomplished by moving the brushes toward each other until they come into coinciding position and by moving the same apart beyond this position, it will be found that the power factor becomes extremely poor for speeds above synchronism. The total displacement of the brush system at over-synchronous speed in fact must take place in a direction which is opposite to that required for a speed below synchronism in case the power factor shall be improved. According to my invention the commutator brushes are displaced over the periphery of the commutator in such a way that the power factor will be improved at speeds which are below as well as above synchronism. The connecting chords between the several pairs of brushes belonging to the same phase, the distance and angular position of which corresponds to the magnitude and phase of the voltage impressed upon the stator, will then no more remain parallel to each other in all positions of shifting, but the inclination of these brush chords will be changed in such a manner that for speeds below synchronism they are inclined toward one side and for speeds above synchronism toward the other side as compared with the parallel position required for a mere regulation of speed. The connecting chords between pairs of brushes will therefore according to the invention include an angle of less than 180° for speeds which are below as well as above synchronism.

In Fig. 2 I have represented the stator winding st, the commutator k and the connections between commutator brushes and stator winding of a motor of this kind. The position of the brushes 1, I is shown for one phase only and corresponds to the smallest speed of the motor resulting in a simultaneous phase compensation, the brush chord being displaced by the angle α relatively to the direction of the axis of the connected stator winding. In order to increase the speed of the motor the brushes of one set are moved relatively to those of the other set at uniform speed which, however, is different for either set of brushes so that coincidence of the brushes on the same commutator segment will take place in the position 2, II corresponding to synchronous speed. If these brushes are further displaced in this manner until they finally arrive in the position 3, III, the motor will reach its maximum speed at which again good phase compensation will take place, since the brush chord will now be displaced by an angle γ in the opposite side toward the direction of the axis of the stator winding. The brush chord at a speed above and the brush chord at a speed below synchronism will form the angle ε, this angle being smaller than 180°. It may be remarked that the drawing holds true for a two-pole motor; in case of more poles the angles will be properly changed but the sense of the regulation will remain the same.

As such a motor possesses in general by itself a better power factor at speed above synchronism than at speeds below synchronism, it is frequently advantageous to choose different angles α and ε, and in particular to augment angle α for speeds below synchronism and to detract from the angle ε for speeds above synchronism. This is accomplished in a simple manner by having the position of coincidence of the brushes somewhat changed, namely so as to be unsymmetrical to the direction of the axis of the stator winding, as represented in Fig. 2.

In the exact position of coincidence of the brushes it will not be possible to add a properly phase-displaced additional voltage for the stator circuits and therefore phase compensation cannot be attained. For speeds above and below synchronism, however, on an assembled motor brush positions may be experimentally found which are most advantageous for a favorable power factor as well as for a good efficiency of the motor. By means of cams or similar devices, now, the proper motion for the brushes may be obtained according to the law of displacement thus found.

Arrangements of this kind, however, are rather complicated and in order to simplify the mechanism, the most favorable brush positions which are possible may not be fully utilized. For this purpose a simple brush gear may be obtained, that brushes of each phase are moved relatively to each other at approximately even velocity, if care be taken that only the velocities of the brushes at the beginning and at the end of each phase winding are different from each other. For the end and middle position then favorable angle positions may be secured, while for the intermediate brush positions slight deviations from the most favorable value will take place. This opposite motion of the brush holders can be accomplished in a simple manner, for instance by employing cog-wheels or lever connections originating from a common driving mechanism which is connected with either brush holder by a somewhat different ratio of transmission.

In Fig. 3 I have represented a number of intermediate positions for the commutator brushes of a motor according to my present invention. Position 1, I is assumed to correspond to the smallest under-synchronous speed. The amount and phase of the alternating voltage impressed upon the stator winding will therefore be given by the amount and phase position of the chord 1, I, which in this case includes a considerable angle with the stator axis s, s in order to obtain good phase compensation. In Fig. 4 the amount of this voltage is incorporated as vector to the end point 1.

In case of uniform shifting of the two brushes against each other at different speeds, they will pass through the positions 2, II, 3, III to 8, VIII as shown in the diagram of Fig. 3. The chords between the brushes are again entered as voltage vector in the diagram of Fig. 4 up to the end points as indicated by proper numerals, so that the voltage vector will follow the course of the curve 1, 2, 3, 4, 5, 6, 7 and 8, if the speed is regulated from the smallest value below synchronism up to the highest value above synchronism. While in case of a normal motor in which the brushes are displaced relatively to each other at the same velocity, the voltage vector at the stator winding will maintain its direction and only change in amount from a positive to a negative value, namely from $a$ to $b$ of Fig. 4, in the here described mode of brush shifting also a phase variation of the voltage vector is obtained, such as required for a proper compensation of the power factor in the motor for speeds above as well as below synchronism.

The mechanism for shifting the brushes of the motor, which is shown in two forms in Figs. 5 and 6 will be apparent from the drawing. I have shown the motors of Fig. 5 and Fig. 6 in a four-pole, three-phase arrangement which results in the employment of six brushes bearing on the commutator, as shown, so that the angle of shifting of the brushes which is indicated in the drawing as being about 90 space degrees will correspond to a shifting of the brushes of about 180 electrical degrees, such as must be approximately provided for in order to regulate the motor according to this invention.

In Fig. 5 the brush holders of the two sets of brushes are shown with extensions represented by the characters 10, 11 respectively. These extensions 10 and 11 are respectively operated by lever mechanisms which are again respectively adjusted by the cams 12 and 13 mounted upon a common axle 14 which may be angularly adjusted by the hand wheel 15 as desired. More particularly this mechanism may consist of levers 16 and 17 respectively attacking at their lower ends said extensions 10 and 11. At the upper ends the levers 16 and 17 are connected to further levers 18 and 19 respectively which at their other ends are pivoted as indicated at 20 and 21. The levers 18 and 19 carry rollers at their middle part as shown, which rollers roll upon the circumference of the cams 12 and 13 having a periphery of proper form as above indicated.

Instead of a cam mechanism for shifting the sets of brushes as shown in Fig. 5, I may as well employ a cog-wheel mechanism as indicated at Fig. 6 of the drawings.

This cog-wheel mechanism consists of the pinion 22 meshing with the gear 23 provided upon the circumference of the brush holder of one set of brushes, an intermediate gear between the axle 14 and the axle 24 for imparting opposite motion to the latter, a pinion 25 mounted upon said axle 24 and meshing with the gear 26 which is provided at the circumference of the brush holder of the second set of brushes. The ratio between pinion 22 and gear 23 is different from that between the pinion 25 and the gear 26 as can also be seen from the different sizes of these pinions. Thus when rotating the handle 15 the gears 23 and 26 which are respectively connected to the two sets of brushes will be rotated one in forward and the other in backward direction and more particularly at different velocities. In this case also any desired manner of shifting the two sets of brushes relatively to each other and relatively to the stator winding may be obtained by properly choosing the gear ratios as a function of the speed and power factor characteristics of the motor.

Having thus described my invention I do not wish to limit myself to the exact constructions shown and described herein, but aim in the appended claims to cover all modifications which fairly fall within the scope of my invention. I therefore claim as new and desire to secure by Letters Patent of the United States:—

1. An alternating current motor comprising a rotor winding having a commutator; slip rings for supplying said rotor winding from an alternating current line; two sets of brushes bearing on said commutator; a stator winding supplied from both of said sets of brushes; and adjusting mechanism for positively shifting said sets of brushes at different velocity in opposite sense of rotation for obtaining a speed regulation of said motor and a high power factor throughout the range of speed.

2. An alternating current motor comprising a rotor winding having a commutator; slip rings for supplying said rotor winding from an alternating current line; two sets of brushes bearing on said commutator; a stator winding supplied from both of said sets of brushes; and a mechanism for simultaneously moving said sets of brushes through different but approximately proportional spaces in opposite directions relatively to each other and relatively to said stator winding.

3. In an alternating current motor, a rotor provided with a winding and a commutator therefor, slip rings for supplying current to said rotor winding from an alternating current source, two adjustable brush sets bearing on said commutator, a stator winding connected to both sets of brushes, and means for simultaneously moving said brush sets in opposite directions, said brush-moving means being adapted to move a brush connected to one end of a phase winding at different speed than a brush connected to the other end of said phase winding.

4. In an alternating current motor, a rotor provided with a winding and a commutator therefor, slip rings for supplying current to said rotor winding from an alternating current source, two adjustable brush sets bearing on said commutator, a stator winding connected to both sets of brushes, and means for simultaneously moving said brush sets in opposite directions, said brush-moving means including suitable cams for moving brushes connected to opposite ends of a phase winding at different speeds to enhance the efficiency of said motor.

5. In an alternating current motor, a rotor provided with a winding and a commutator therefor, slip rings for supplying current to said rotor winding from an alternating current source, adjustable brushes bearing on said commutator, stator windings connected to said brushes, and means for moving the brushes connected to opposite ends of each phase winding of said stator in opposite directions at different relative speeds.

6. In an alternating current motor, a rotor provided with a winding and a commutator therefor, slip rings for supplying current to said rotor winding from an alternating current source, adjustable brushes bearing on said commutator, stator windings connected to said brushes, and means for moving the brushes connected to opposite ends of each phase winding of said stator in opposite directions at different relative speeds, said brush moving means being adapted to move the brushes connected to opposite ends of a phase winding of said stator into and out of position corresponding to synchronism, the relative position of the brushes in synchronism with respect to the axis of the stator winding, being unsymmetrical.

In witness whereof I have hereunto set my signature in the presence of two subscribing witnesses.

REINHOLD RUEDENBERG.

Witnesses:
WOLDEMAR HAUPT,
HENRY HASPER.

Copies of this patent may be obtained for five cents each, by addressing the "Commissioner of Patents, Washington, D. C."